US005831526A

United States Patent [19]

Hansler et al.

[11] Patent Number: 5,831,526

[45] Date of Patent: Nov. 3, 1998

[54] ATMOSPHERIC HAZARD DETECTOR NETWORK

[76] Inventors: Richard L. Hansler, 210 Bell St. Suite 3, Chagrin Falls, Ohio 44022; Mark H. Thomsen, RR #4 Box 49, Rockwood, Ontario N0B-2K0, Canada; Joseph Michael Allison, 2070 Miami Rd., Euclid, Ohio 44117

[21] Appl. No.: 811,132

[22] Filed: Mar. 3, 1997

Related U.S. Application Data

[63] Continuation-in-part of Ser. No. 691,133, Aug. 1, 1996, abandoned.

[51] Int. Cl.$^{6}$ .......... G05B 1/08

[52] U.S. Cl. .......... 340/539; 340/531

[58] Field of Search .......... 340/539, 531, 340/506

[56] References Cited

U.S. PATENT DOCUMENTS 4,417,235 11/1983 Del Grande .......... 340/531
4,660,023 4/1987 Thern et al. .......... 340/521
4,673,920 6/1987 Ferguson et al. .......... 340/539
5,386,209 1/1995 Thomas .......... 340/539

*Primary Examiner*—Donnie L. Crosland
*Attorney, Agent, or Firm*—Charles E. Bruzga

[57] ABSTRACT

A network of identical atmospheric hazard detectors communicates a locally sensed hazard condition directly to multiple neighboring detectors using RF command communication, without the use of wires and without a central control location. Each detector includes a sensor of an atmospheric hazard, a detection circuit for measuring the sensor output and creating a local hazard signal, an alarm indicator, an RF transmitter for sending a neighboring hazard signal to the network, and an RF receiver for receiving a neighboring hazard signal from the network. The local alarm and neighboring alarm control signals produce discernibly different alarm indications from the detector's alarm device, facilitating an attempt to locate the origin of a hazard. In the preferred embodiment, every detector functions as a receive/transmit relay station, enabling the network to be extended in spatial expanse without limit and without increasing the power output of the RF transmitter. Auxiliary devices are included, for example, a radio controlled light for emergency illumination.

39 Claims, 6 Drawing Sheets

ATMOSPHERIC HAZARD DETECTOR NETWORK

This is a continuation-in-part of application Ser. No. 08/691,133, filed Aug. 1, 1996, now abandoned.

FIELD OF THE INVENTION

The present invention relates to a network of cooperating atmospheric hazard detectors, and to the individual detectors. More particularly, the invention relates to a network of atmospheric hazard detectors that cooperate together with RF signals to provide a local alarm indication by a detector subject to a local hazard, and a discernibly different neighboring alarm indication by neighboring detectors.

BACKGROUND OF THE INVENTION

Inexpensive atmospheric hazard detectors are available for detecting dangerous levels of an atmospheric hazard, such as fire, smoke, radon or carbon monoxide. These detectors customarily provide an audible alarm indication of the presence of a hazard. However, in a large or partitioned residence, office or building, it may be difficult for an occupant to hear the audible alarm indication of a detector whose alarm indication becomes attenuated by distance or by intervening objects. A person sleeping on the second floor of a residence might not hear an audible alarm indication from a smoke detector located in the basement or first floor of the residence. One approach to remedy this problem has been to employ a relatively complex and expensive system including multiple hazard detectors which communicate to a central alarm monitoring station. Another approach has been to hard wire together a group of hazard detectors so that they all provide an alarm indication in the event of a hazard proximate any of the detectors. However, this approach often entails considerable expense just for the installation of the wiring. One low cost solution is disclosed in U.S. Pat. No. 4,417,235 ('235 patent).

The '235 patent teaches a network of abnormal condition detectors that cooperate in the following manner. When one detector senses an abnormal condition, it sounds an audible alarm. Every detector in the network is equipped with a microphone to sense the audible alarm and, in turn, to sound an audible alarm of its own. While this invention avoids the expense of an alarm system employing a central monitoring station, or employing a group of detectors hard-wired together, it suffers from two potentially unsafe anomalies. First, due to the very limited range of a detector's sound transmission, it is likely that, to propagate an alarm status, the network must depend upon cascading the detectors. Therefore, the network is likely to suffer a domino effect failure when one detector fails. Second, the network locks up in the alarm state due to positive feedback around multiple incidental feedback loops. To shut off an alarm, the user must visit all of the detector sites in the network to activate alarm-inhibit timers. This "operational difficulty," as admitted in the '235 patent, is particularly annoying when a detector is located in a kitchen or other location prone to accidental alarms. Therefore, the user is likely to intentionally disable at least part of the network, resulting in diminished protection.

OBJECTS OF THE INVENTION

It is an object of the present invention to provide a low cost network of atmospheric hazard detectors that more safely establishes a widespread alarm in response to a hazard condition originating at any one of the detectors, by virtue of being free from domino effect failures, and by virtue of returning automatically to the quiet state when all hazards are clear.

Accordingly it is an object of the invention that the network may consist of identical detectors capable of communicating a locally sensed hazard condition directly to multiple detectors using RF command communication without the use of wires and without a central control location.

A further object of the invention is to provide a network of hazard detectors that can facilitate an attempt to locate the origin of a hazard by making the detectors that sense the hazard condition sound differently from those that respond by remote command.

It is an object of embodiment 1 and embodiment 2 of the invention that the detector not turn on its RF transmitter to re-transmit the alarm signal received by its RF receiver. It is an object of modifications applied to embodiment 1 and embodiment 2 to preclude communication interference by enabling only one transmitter to be active during any given time interval.

It is an object of the most preferred embodiment of the invention, embodiment 3, that the detector turn on its RF transmitter and re-transmit the alarm signal received by its RF receiver, thereby enabling the network to be extended in spatial expanse without limit and without increasing the power output of the RF transmitter.

A further object of the invention is to include optionally applied auxiliary devices to perform specialized device-specific functions in response to a hazard alarm.

SUMMARY OF THE INVENTION

In all embodiments, the invention provides a network of atmospheric hazard detectors. The network consists of any number of identical detectors. The detector is described as follows. A sensor is provided for sensing the presence of an atmospheric hazard and creating a sensor output. A detection means is provided for measuring the sensor output and creating a signal when the atmospheric hazard exceeds a predetermined danger level. A human-perceptible alarm indication means is provided. A RF receiver is provided for receiving a hazard signal from the other network detectors. A RF transmitter is provided for sending a hazard signal to the other network detectors. Modulation of an RF carrier with a lower frequency and/or with a digital code to prevent intrusion of unwanted signals is a well known technique and is highly preferred in the present invention.

The present invention obviates the two potentially unsafe anomalies of the '235 patent described above. To begin with, the probability of a domino effect failure is greatly diminished by the use of radio frequency communication having a range wide enough to make it likely that every detector in the network will be linked with several other detectors. Lock up in the alarm state, in embodiment 1 and embodiment 2, is precluded by allowing only one-way communication between the detectors that sense the hazard directly and all other detectors in the network. A received RF alarm signal is never re-transmitted so that feedback loops are not created to begin with. However, in embodiment 3, the preferred embodiment, every detector re-transmits its received RF signal. Alarm lock-up in this case is obviated by a novel approach in which the detector has its ability to transmit inhibited (irrevocably) for intervals spaced throughout the entire time that the hazard exists. The detector that senses a hazard transmits bursts of encoded RF energy. The bursts are received and then re-transmitted by other detectors. Since a re-transmitted burst is triggered by a received burst, they are synchronized so that there are regularly spaced intervals during which no detector is transmitting. These dead intervals are made long enough to allow all re-transmissions to die when the hazard is no longer being sensed.

Included as part of the present invention are optional auxiliary devices for performing specialized, device-specific functions in response to a hazard alarm. The devices are battery-operated units comprising RF receivers and device-specific objects, but do not contain hazard sensors nor transmitters nor alarms. An example of a mentioned auxiliary device is a light to provide emergency illumination. The devices are more cost effective than simply adapting a normal detector to perform a specialized function. Further, the optimum location for a device depends upon its specialized function, usually where a hazard sensor is not very effective anyway. Hazard detectors in general need to be located on (or near) the ceiling where smoke and other, lighter-than-cool-air gasses accumulate. Emergency lighting sources, on the other hand, should be located near the floor where they are the most effective in showing the way out of a building to a person crouching along in the presence of smoke. The present invention enables the hazard detectors and the emergency illumination sources to be separately, and therefore, optimally, located without interconnecting or power supply wires. Therefore, the present invention with the emergency light auxiliary device is far superior to conventional smoke detectors with light sources attached to provide emergency illumination. The emergency lighting auxiliary devices of the present invention are small and inexpensive so that they may be placed at every exit and stairways.

A second example of a mentioned auxiliary device is a recorder/playback unit connected to an outside telephone line. When activated by the RF alarm signal, and after a suitable time delay (to obviate false alarms), the object dials a preset telephone number and plays a recorded message to the respondent. Because it is RF-linked to the hazard detectors, the recorder/playback auxiliary device may be conveniently located near an existing telephone jack.

A third example of a mentioned auxiliary device is a siren or horn mounted outdoors to alert neighbors or passers by of an existing hazard condition.

A final example of a mentioned auxiliary device is a door latch mechanism to replace the conventional latch on an outside door. When activated by the RF alarm signal, and after a suitable time delay (to obviate false alarms), the door not only unlocks but opens automatically. The door latch auxiliary device is applicable in barns and stables where animals are kept; or any other application where the opening of a door may be a difficult task for animals or humans.

Also highly preferred, is a battery saver technique in which, for example, the detector is alternately powered up for 50 milliseconds, then powered down for 5 seconds in a periodic fashion. When a hazard is sensed, the detector remains powered up continuously until the hazard clears. The average battery current during the standby condition in this example is reduced by a factor of 100 with virtually no loss of function and only a 5 second incidental maximum delay between the onset of a hazard and the subsequent alarm.

The detector preferably includes two momentary-type switches: a test switch and a silence switch. The test switch simulates a local hazard while the silence switch shuts off the alarm for a fixed time. The purpose of the silence switch is to discourage more permanent disabling by the user when the alarm is harmlessly set off in a kitchen, for example.

BRIEF DESCRIPTION OF THE DRAWINGS

In the following detailed description, reference will be made to the attached drawings in which like reference numerals refer to like, or corresponding elements, throughout the following figures, and in which.

DETAILED DESCRIPTION OF THE DRAWINGS

Figure 1:
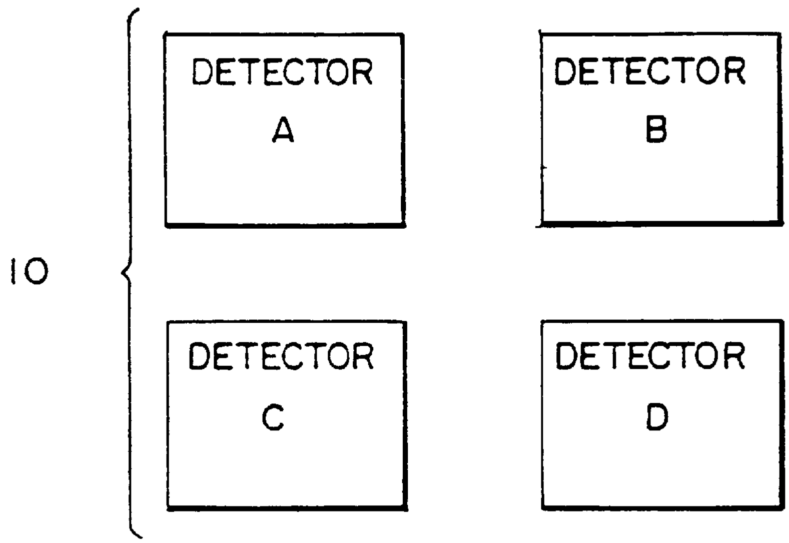
FIG. 1 is a block diagram view of a network of atmospheric hazard detectors in accordance with the present invention.

FIG. 1 shows a network 10 of atmospheric hazard detectors A–D. Although four detectors are shown, network 10 more broadly comprises two or more detectors. Each of detectors A–D is suitably embodied as embodiment 1, or embodiment 2, or embodiment 3 shown respectively as detector 12 in FIG. 2, detector 34 in FIG. 4, and detector 46 in FIG. 5. The (many) common components, numbered identically in the respective drawings of the three mentioned embodiments, provide identical functions and are described first.

Figure 2:
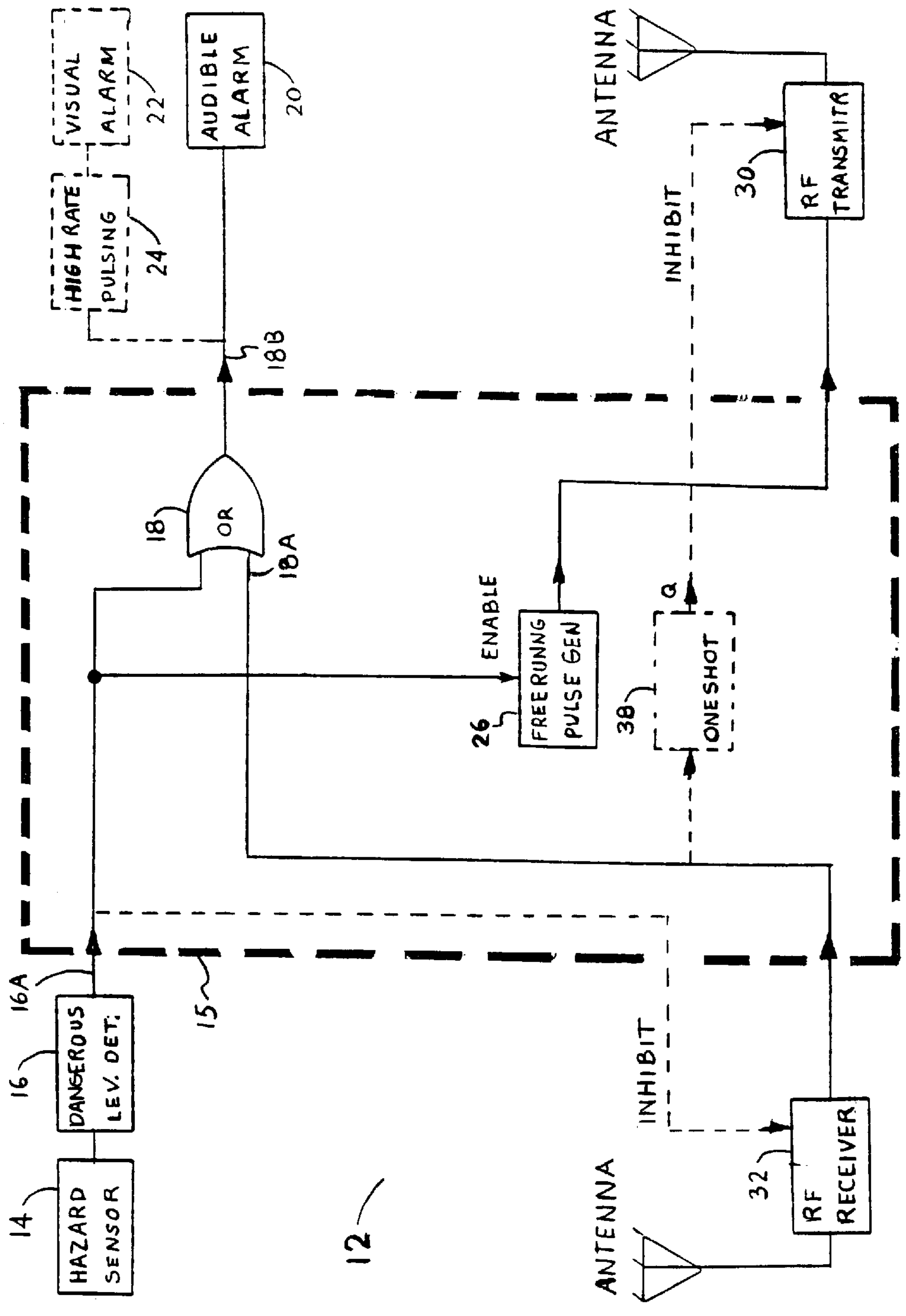
FIG. 2 is a block diagram view of a single atmospheric hazard detector, adapted for use in the network of FIG. 1, in accordance with embodiment 1, with a modification to preclude multiple transmissions shown in phantom.
Figure 4:
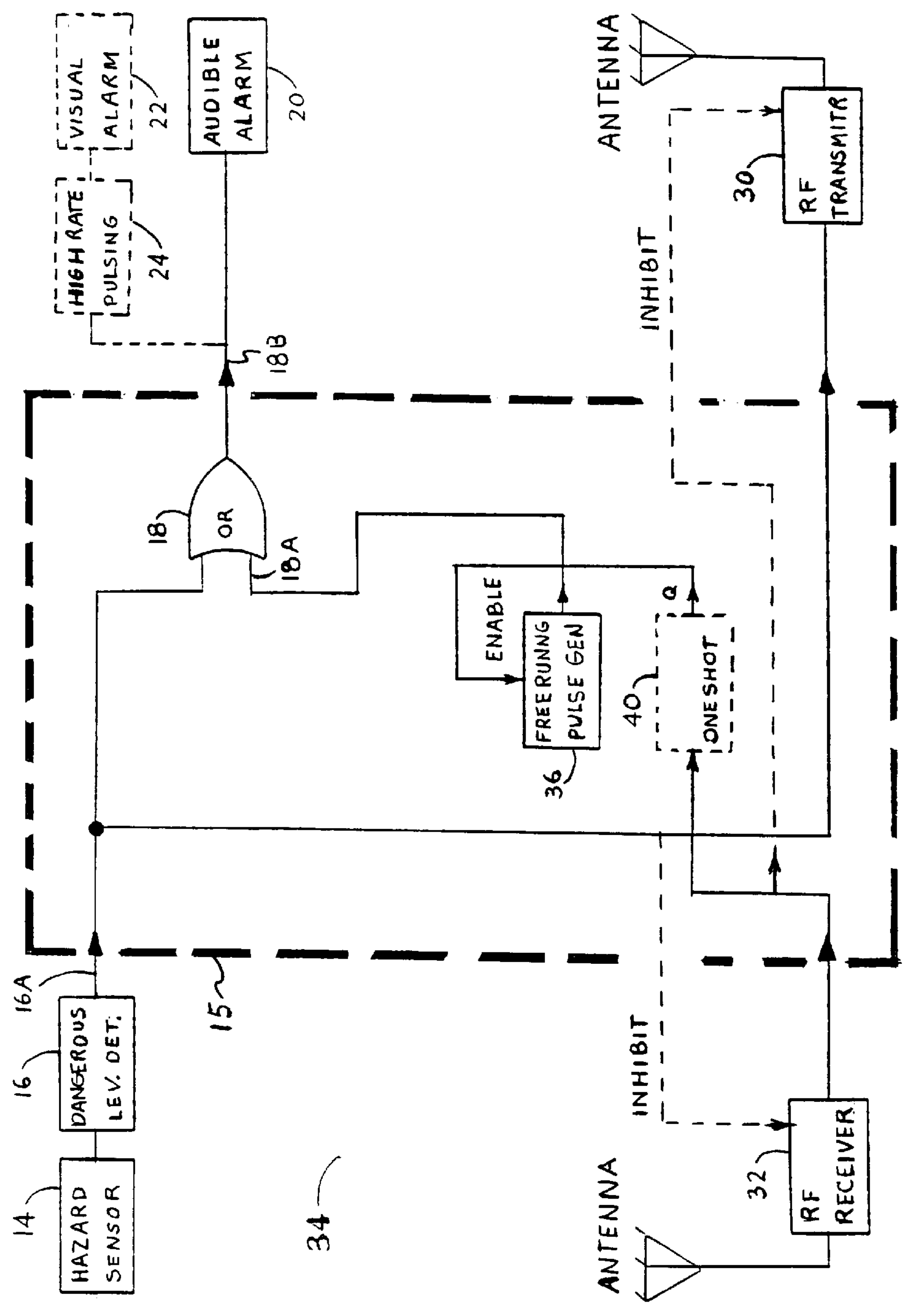
FIG. 4 is a block diagram view of a single atmospheric hazard detector, adapted for use in the network of FIG. 1, in accordance with embodiment 2, with a modification to preclude multiple transmissions shown in phantom.
Figure 5:
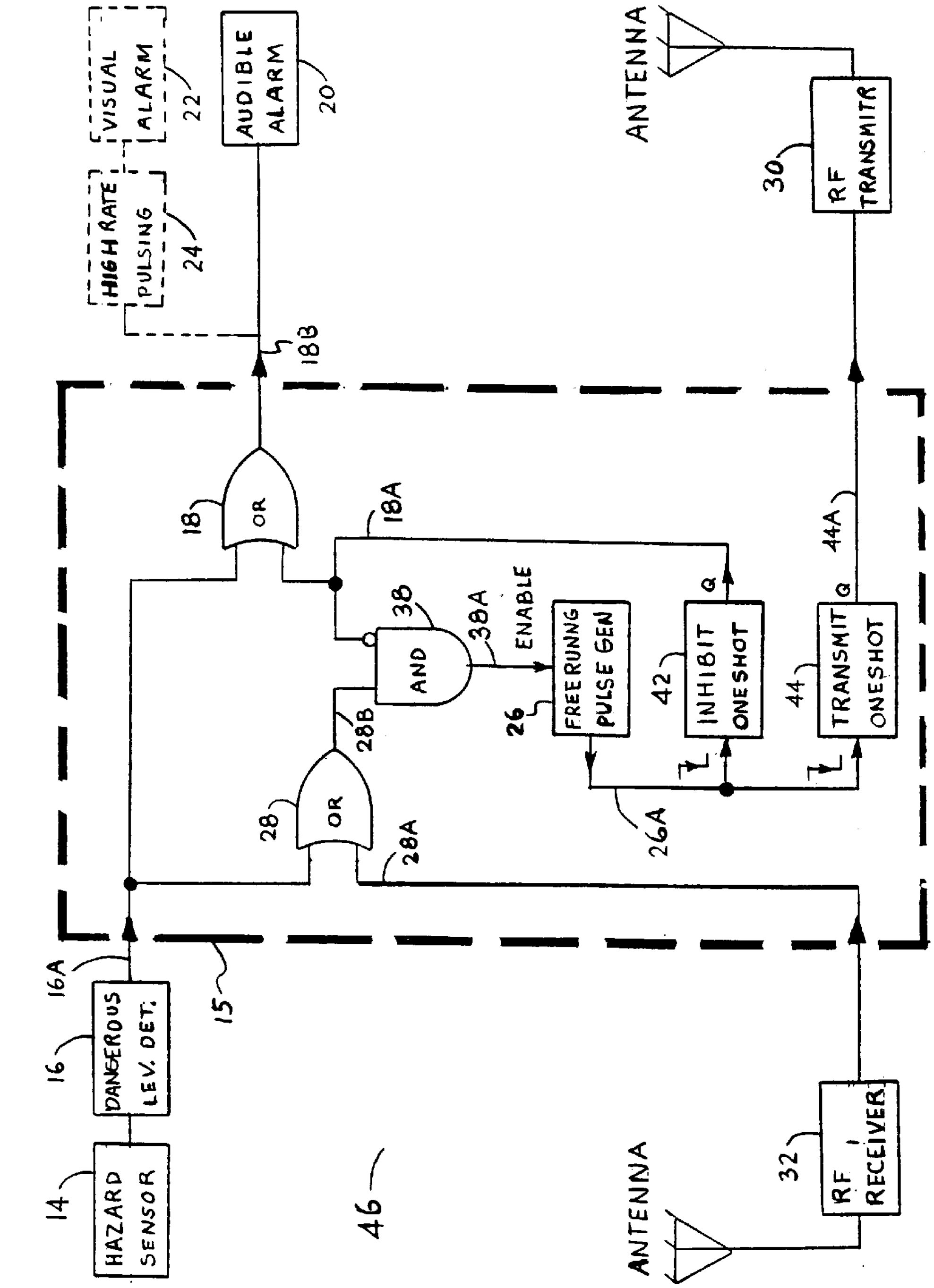
FIG. 5 is a block diagram view of a single atmospheric hazard detector, adapted for use in the network of FIG. 1, in accordance with embodiment 3, the preferred embodiment.

The local hazard alarm function is implemented identically in all three of the mentioned embodiments. With reference to FIGS. 2, 4, and 5, a sensor 14 of an atmospheric hazard, such as fire, smoke, radon or carbon monoxide is included. Such sensors are known per se in the art, and may measure chemical, electrical, optical, or thermal characteristics of the atmosphere near the sensor. A dangerous-level detector 16, responsive to the output of hazard sensor 14, outputs a continuous type local hazard signal on line 16A when the hazard being sensed reaches a predetermined threshold value. Although not illustrated, a local hazard signal may be provided on line 16A in response to dangerous levels of any of several atmospheric hazards, such as smoke and heat from a fire. Thus, the local hazard signal on line 16A could represent the output of a logic OR gate (not shown) having a plurality of inputs connected to the respective outputs of a plurality of dangerous-level detectors (not shown) for detecting different atmospheric hazards. An OR gate 18 which receives the local hazard signal from line 16A is included. By virtue of the inherent behavior of any OR gate, the continuous type local hazard signal on line 16A overrides any other signal at line 18A and activates the audible alarm circuit 20 so as to produce a continuous type local alarm indication.

In all the mentioned embodiments, a RF receiver 32 is provided for receiving a hazard signal from the other network detectors, and, a RF transmitter 30 is provided for sending a hazard signal to the other network detectors. Modulation of an RF carrier with a lower frequency and/or with a binary code to prevent intrusion of unwanted signals is well known and is highly preferred in the implementation of the RF receiver 32 and transmitter 30.

In all the mentioned embodiments, the neighboring hazard signal at the output of RF receiver 32 (eventually) gets applied to the OR gate 18 at line 18A in a intermittent type (e.g., pulsed) format. If the local hazard signal is inactive (line 16A not active), then, by virtue of the inherent behavior of any OR gate, the pulsed signal at line 18A results in a similarly pulsed audible indication from audible alarm 20. Thus all mentioned embodiments, at any given time, may produce one of two different alarm indications from the same audible alarm 20 that are discernibly different from each other. One alarm indication represents a local hazard, i.e., a hazard detected by dangerous-level detector 16. The other alarm indication represents a neighboring (or remote) hazard that is detected by a neighboring detector in network 10 of FIG. 1. The user can easily decide if the hazard is strictly a neighboring hazard (intermittent type audible indication) or a local hazard (continuous type audible indication). If both types of hazards are present, then the indication will be the same as for a local hazard.

Accompanying the audible alarm 20, a visual alarm 22 (shown in phantom), e.g., a xenon flash lamp, could be used in any of the mentioned embodiments. In this modification, a high-rate pulsing circuit 24 is preferably interposed between output line 18B of OR gate 18 and visual alarm circuit 22, to cause a pulsing rate that is high relative to the pulsing rate of a neighboring alarm signal.

Figure 3A:
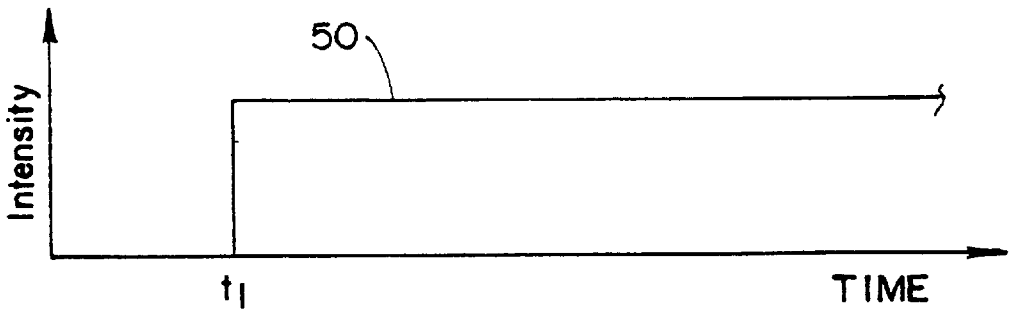
FIGS. 3A–3D show respective, human-perceptible indications of local and neighboring alarms.
Figure 3B:
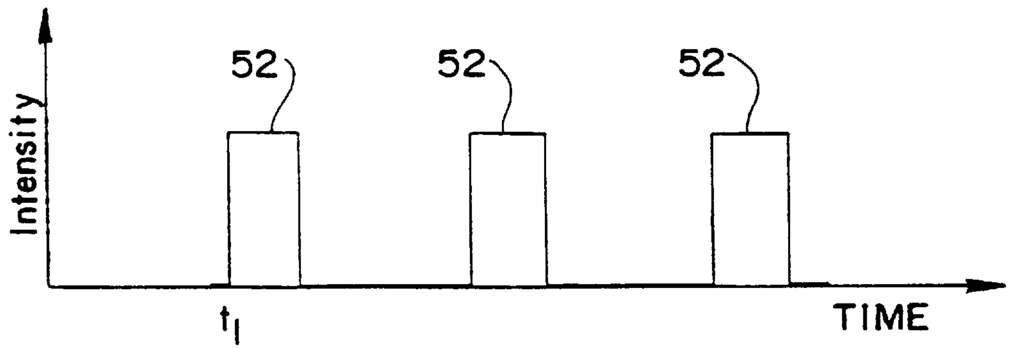
Figure 3C:
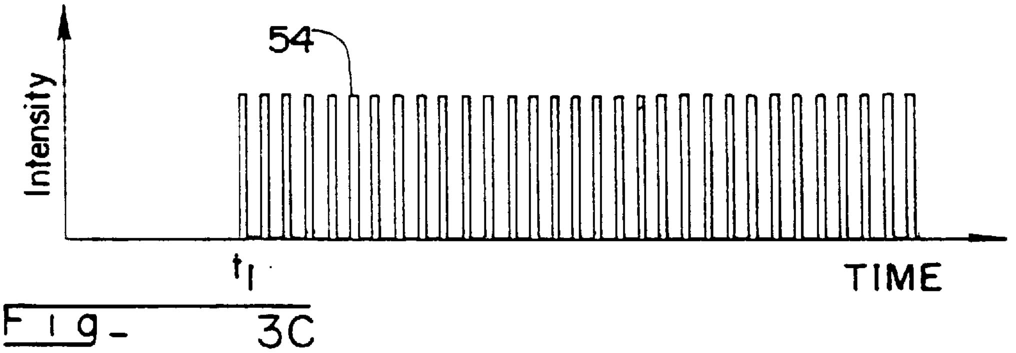
Figure 3D:
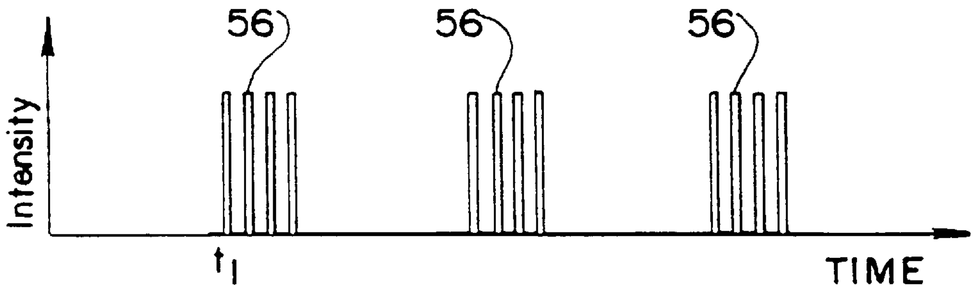

FIGS. 3A–3D illustrate the preferred set of alarm indications. Curve 50 of FIG. 3A illustrates a preferred, continuous audible alarm output commencing at time $t_1$ for the local alarm indication. Curves 52 of FIG. 3B illustrate preferred, neighboring alarm indications that are pulsed. Curve 54 of FIG. 3C illustrates a preferred, continuous, high-frequency pulsing of a visual alarm 22 (e.g., a xenon flash lamp), with the high-frequency pulsing provided by high-rate pulsing circuit 24 in response to the local alarm signal. Curves 56 comprise envelopes of high-frequency pulsing of a visual alarm 22 in response to the neighboring alarm signal, with the high-frequency pulsing provided by high-rate pulsing circuit 24.

In the most economical implementation of the invention, visual alarm circuit 22 and high-rate pulsing circuit 24 are not used; only the audible alarm circuit 20 is used. Such a circuit then provides the discrimination between a local audible alarm as shown in FIG. 3A, for instance, and the neighboring audible alarm as shown in FIG. 3B.

EMBODIMENT 1 (FIG. 2)

Detector 12 of FIG. 2 achieves the desired intermittent type (e.g., pulsed) format neighboring alarm indication by interrupting the transmitted signal in a corresponding manner. Referring to FIG. 2, with a local hazard detected by dangerous-level detector 16, resulting in a local hazard signal on line 16A, pulsing circuit 26 is activated to provide a pulsed transmit-command signal to RF transmitter 30. The RF transmitter 30 then broadcasts to other detectors of network 10 (FIG. 1), a neighboring pulsed hazard signal, i.e., a signal that a hazard exists in a neighboring detector. Pulsing circuit 26 thus creates a master pulsing period for synchronous pulsing of all neighboring detectors. With the neighboring detectors synchronously pulsing on and off, periods of quiet will occur from the neighboring detectors, enabling the relatively more continuous alarm signal of the detector subject to a local hazard, and hence the location of the hazard, to be easily discerned.

EMBODIMENT 2 (FIG. 4)

Detector 34 of FIG. 4 achieves the desired intermittent type (e.g., pulsed) format neighboring alarm indication by interrupting the received signal in a corresponding manner. With reference to FIG. 4, when a local hazard is sensed, line 16A becomes active and activates the RF transmitter 30 to transmit a continuous signal. The corresponding continuous output from the RF receiver 32 of a neighboring detector is then interrupted in a repetitive manner by Free Running Pulse Generator 36 before being applied to line 18A as a neighboring alarm signal. Detectors of the type shown in FIG. 4 pulse their alarm indicators at a free running rate. Therefore, the neighboring alarm indication produced by a network of such detectors 34 of FIG. 4 are out of synchronism with each other.

Detector 34 of FIG. 4 can optionally incorporate a oneshot timer in the output line of the RF receiver. The oneshot timer 40 retains its active output state for a fixed time following de-activation of its input. Therefore, a neighboring alarm indication persists even if such neighboring alarm signal dies quickly at the output of RF receiver 32. The dying of a neighboring RF alarm signal may result, for instance, from destruction of a detector transmitting such neighboring hazard signal, or from the loss of power of such transmitting detector.

THE PREFERRED EMBODIMENT

EMBODIMENT 3 (FIG. 5)

Of the three mentioned embodiments, detector 46 (FIG. 5) stands alone in its ability to relay the neighboring alarm signal. Referring to FIG. 5, during any hazard condition, detector 46 receives a continuous stream of RF bursts alternating with intervals of RF silence. Each burst of RF, triggered by pulsing circuit 26 of the sending detector 46, produces a corresponding pulse at the receiver output line 28A of the receiving detector 46. OR gate 28 of the receiving detector then applies these pulses to AND gate 38. Assuming that line 18A is inactive, the AND gate 38 output line 38A then applies the mentioned pulses to the "enable" input of pulse generator 26 of the receiving detector. Pulsing circuit 26 is designed to produce one output pulse at line 26A within the time that an input pulse is present at the enable input at line 38A. The pulses produced by the pulsing circuit 26 of the receiving detector are thus synchronized to the pulses produced by the pulsing circuit 26 of the sending detector 46. The trailing edge of the pulse at line 26A triggers both oneshot pulse-forming circuits 42 and 44. Transmit oneshot circuit 44 forms the transmit command pulse at line 44A, applied to command the transmitter to turn on and remain on for the duration of the transmit oneshot 44 pulse (0.1 sec.). Inhibit oneshot 42 forms the inhibit pulse at line 18A, applied to combining circuit 38 through an inverting input to inhibit further pulses from getting through AND gate 38 until inhibit oneshot 42 has timed out (0.4 second). The inhibit oneshot pulse at line 18A, is applied to OR gate 18 as the neighboring hazard signal.

AVOIDING TRANSMISSION INTERFERENCE PROBLEMS

Simultaneous transmissions from two detectors can interfere with each other at a third detector's receiver, resulting in a communication failure at the third receiver. The problem can be severe when a simple serial digital encoding scheme is used. One transmitter may be in the middle of its serial code sequence when another transmitter begins transmitting the start of the code sequence. Even though the codes from the two transmissions are programmed to be the same, they probably will be out of step with each other and will be scrambled at a third receiver unless specific design steps are taken to synchronize the code transmissions.

In embodiment 1 and embodiment 2, interference can result when a second detector has its transmitter turned on due to the presumably spreading hazard activating the local hazard signal of a second detector. Accordingly, a modification has been included in the invention which is optionally applied to embodiment 1 or embodiment 2 (but not embodiment 3, the re-transmission embodiment). The modification allows only one of the transmitters in the network to be turned on throughout the duration of an alarm condition while all other transmitters are inhibited, thereby obviating the interference problem. The following explains in detail how multiple transmitter activation is precluded.

Within any particular detector, whenever an RF alarm signal is being received, an output from the receiver serves an additional function as an inhibit command to the transmitter. On the other hand, when the transmitter is active, the transmitter's activating signal serves an additional function as an inhibit command to the receiver. This logic prevents a transmitter from being turned on once an RF transmission already exists. The detector that is first to respond to a local hazard activates its own RF transmitter. All other detectors respond to this first detector's RF signal by inhibiting their transmitters while activating their nearby hazard alarms. When the presumably spreading hazard eventually activates the local hazard condition of other detectors, these other detectors continue to inhibit their own transmitters in response to the pre-existing RF signal. In the event that the transmitting detector fails, the (reduced) network continues to function normally so that, the very next detector to be activated by a local hazard will take over the transmitting function.

The modification of embodiment 1 to preclude multiple transmissions within the mentioned network is indicated in FIG. 2 in phantom as the inhibit input commands to the transmitter and receiver. The inhibit logic has the oneshot timer 38 interposed between the RF receiver 32 output and the inhibit input of RF transmitter 30. The oneshot timer retains its active output state for a fixed time following de-activation of its input (e.g., with an R-C circuit). The one-shot time must be set greater than the off-time interval of transmission produced by pulsing circuit 26 so that the inhibit command at transmitter 30 is continuous throughout the pulsing interval.

The modification of embodiment 2 to preclude multiple transmissions within the mentioned network is indicated in FIG. 4 in phantom as the inhibit input commands to the transmitter and receiver. The output of RF receiver 32 is applied to the RF transmitter 30 as an inhibit command input. Likewise RF transmitter 30 has its activate command input applied to receiver 32 as an inhibit command input.

In embodiment 3 (FIG. 5), the preferred re-transmission embodiment, all detectors within direct RF range of a detector sensing a local hazard-the so-called, first-level detectors-receive the RF signal directly from the initiating detector. The re-transmissions from these first-level detectors are RF bursts that are synchronized and delayed in time relative to the RF burst from the initiating detector. Communication failure due to interference between the initiating and first level detectors is impossible since sufficient communication has already taken place at the instant of re-transmission commencement. Detectors that sense a local hazard subsequent to the initiating detector sensing a local hazard do not create any additional interference problems since the detectors that subsequently sense a local hazard have already been re-transmitting and do not change the instant of onset of their transmitted RF burst after sensing a local hazard. Only the detectors that are out of direct RF range of a detector sensing a local hazard-the so-called, second-level detectors-have a possible interference problem in embodiment 3. However, since these second-level detectors are the only detectors that truly benefit from the retransmission feature, the transmitter and receiver are preferably designed to tolerate interference. Encoding with a continuous modulation signal (tone) rather than a digital code is very helpful. Any time misalignment of continuous tones from multiple sources results simply in a phase shift or a beat frequency in the decoded signal which usually has no harmful affect on the code recognition process. Serial digital encoding is also practical since the RF bursts are synchronized. The code bits in the serial bit stream can be made long enough in duration such that the worst case misalignment of code sequences transmitted by multiple detectors is small (and therefore inconsequential) relative to the duration of a code bit. Time averaging the demodulated envelope of a tone or individual bits in a serial bit stream is very effective in preventing beat frequencies from causing decoding errors. The duration of the serial bits or tone must be long enough to permit substantial time averaging. The longer the averaging time, the more robust the immunity from interference will be.

AUXILIARY DEVICES

Figure 6:
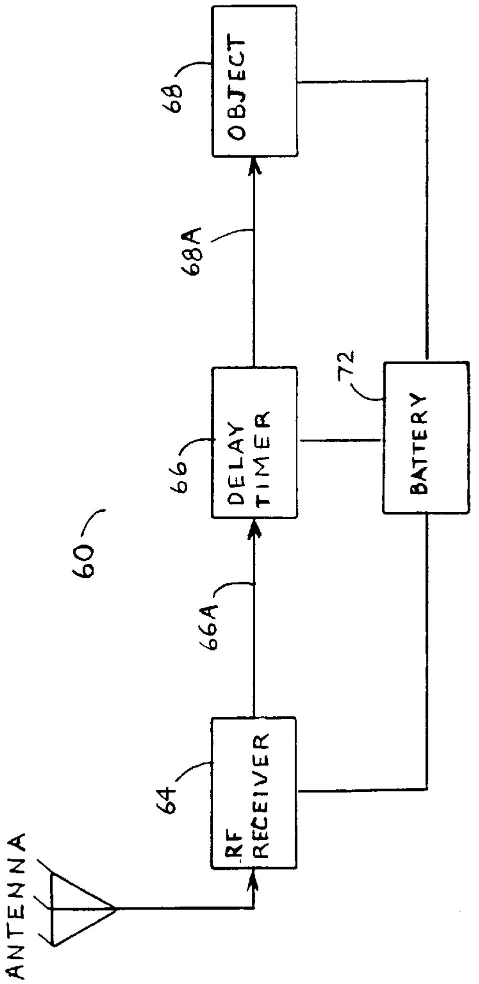
FIG. 6 is a general block diagram view of an optionally applied auxiliary device.

FIG. 6 is a generalized block diagram view of an optionally applied auxiliary device 60, powered by a battery 72. The RF receiver output line 66A, which is also the delay timer 66 input line, becomes active in response to a neighboring alarm signal transmitted from the detectors in the network 10 of FIG. 1. If line 66A continues to be active until the preset time-out interval of the delay timer 66 has elapsed, then the timer output line 68A, which is also the object 68 command input line, will become active. The object 68 will in turn perform a specific function. The purpose of the timer 66 is to prevent false alarm conditions from taking the device specific action assigned to the object function 68. For example, suppose that the object function 68 is assigned the task of calling the fire department and the delay timer 66 is set for two minutes. The alarm condition would need to persist for two minutes before the fire department is called. Other object functions may not require any delay at all. Therefore, the delay timer is preferably user programmable.

Figure 7A:
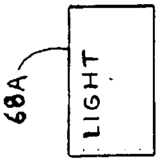
FIGS. 7A–7D show respectively block diagram views of the following device specific objects applied to the general block diagram in FIG. 6.
Figure 7B:
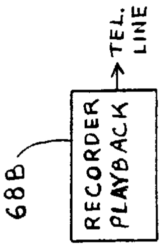
Figure 7C:
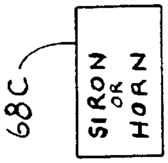
Figure 7D:
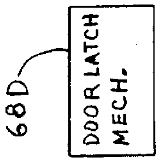

FIG. 7A shows an emergency light 68A to be applied as the object 68 in the auxiliary device 60 (FIG. 6). FIG. 7B shows recorder/playback unit 68B to be applied as the object 68 in the auxiliary device 60 (FIG. 6). FIG. 7C shows a siren or horn 68C to be applied as the object 68 in the auxiliary device 60 (FIG. 6). Finally, FIG. 7D shows a door latch mechanism 68D to be applied as the object 68 in the auxiliary device 60 (FIG. 6).

EMBEDDED-SYSTEMS APPROACH

The drawings for the three embodiments have been arranged in a way that suggests an embedded-systems approach to the practice of the invention. Referring to the drawings (FIGS. 2, 4, and 5) the components enclosed within the broken line box 15 could be replaced by a microprocessor. The lines entering the left side of the box 15 (lines 16A and 28A) would become the microprocessor inputs and the lines leaving the right side of box 15 (lines 18B and 44A), the microprocessor outputs. The functions within the box would then be implemented using a stored program. It is possible (and preferable) to absorb other functions such as the high rate pulsing 24 and dangerous level detector 16 into the stored program as well. Only the RF receiver 32, RF transmitter 30, hazard sensor 14, alarm amplifiers and alarm transducers probably need to be external to a microprocessor. With increased memory size as a tradeoff, the design could be embellished with even more functions implemented by more program steps without incurring additional manufacturing cost. The continuing decline in the price of microprocessors makes attractive the embedded systems approach to the practice of the present invention. The stored program design could be created with routine skill by a person of ordinary skill in the art from a set of software specifications developed directly from the functional descriptions and drawings detailed herein.

While the invention has been described with respect to specific embodiments by way of illustration, many modifications and changes will occur to those skilled in the art. For example, although various functions have been described with reference to specific building blocks such as the OR gate and oneshot pulse former, other building blocks, discrete transistor circuitry, or custom integrated circuits could be used. It is, therefore, to be understood that the appended claims are intended to cover all such modifications and changes as fall within the true scope and spirit of the invention.

What is claimed is:

1. A network of atmospheric hazard detectors, each detector comprising:

(a) alarm-indication means for producing at least one human-perceptible alarm indication;

(b) a sensor for sensing the presence of an atmospheric hazard and creating a sensor output;

(c) detection means for measuring said sensor output and creating a local hazard signal when said atmospheric hazard exceeds a predetermined danger level;

(d) an RF receiver for receiving a neighboring hazard signal from a neighboring atmospheric hazard detector when a dangerous-level output is detected by the neighboring detector;

(e) an RF transmitter for sending a neighboring hazard signal to at least one neighboring atmospheric hazard detector upon said local hazard signal being created, without needing to wait for a synchronizing interval; and (f) alarm-selection means for producing a local alarm control signal whenever said local hazard signal is present, and for producing a neighboring alarm control signal when said neighboring hazard signal is present but said local hazard signal is absent.

2. The network of claim 1, wherein said local alarm and neighboring alarm control signals respectively cause said alarm-indication means to produce discernibly different alarm indications.

3. The network of claim 1, wherein said local and neighboring alarm-control signals result in discernibly different audible alarm indications.

4. The network of claim 1, further comprising control means to cause said neighboring alarm-control signal to result in a pulsed audible alarm, and to cause said local alarm-control signal to result in a relatively more continuous audible alarm.

5. The network of claim 4, comprising a pulsing means connected between said detection means and said RF transmitter for providing an RF signal with a master pulse rate that sets the pulse rates for any neighborhood alarm control signal of any neighboring atmospheric hazard detectors, so as to facilitate identification of a detector subject to a local hazard.

6. The network of claim 4, comprising a pulsing means connected between said RF receiver and said alarm-selection means, for creating said pulsed neighboring alarm control signal in the presence of a neighboring hazard signal received from said RF receiver.

7. The network of claim 6, further including a latch means responsive to a neighboring hazard signal received by said RF receiver, for maintaining the production of a pulsed audible alarm for a predetermined time after initially receiving said neighboring hazard signal.

8. The network of claim 1, comprising control means for causing said neighboring alarm-control signal to result in envelopes of high-frequency pulses of light, and said local alarm-control signal to result in a continuous series of high-frequency pulses of light.

9. The network of claim 1, wherein said RF receiver and RF transmitter include means for modulation coding the neighboring hazard signal so that, when such signal is broadcast by RF transmission, it is received only by neighboring atmospheric hazard detectors employing the same coding.

10. The network of claim 9, further including control means, responsive to the condition of said detection means and said RF receiver for:

(a) disabling said RF transmitter from sending a neighboring hazard signal when said RF receiver receives a neighboring hazard signal before said detection means creates said local hazard signal; and (b) enabling said RF transmitter to send a neighboring hazard signal when said detection means creates a local hazard signal before said RF receiver receives a neighboring hazard signal.

11. The network of claim 10, wherein said control means is further responsive to the condition of said detection means not creating a local hazard signal and said RF receiver receiving a neighboring hazard signal, for disabling said RF transmitter from sending a neighboring hazard signal, so as to prevent a further hazard detector from being confused by a plurality of conflicting RF signals.

12. The network of claim 1, in combination with an auxiliary device comprising:

(a) an RF receiver for receiving a neighboring hazard signal from a neighboring atmospheric hazard detector when a dangerous-level output is detected by the neighboring detector;

(b) a latching means for providing an auxiliary alarm signal only after said RF receiver has received said neighboring hazard signal for a predetermined period of time; and (c) a door latch, responsive to said auxiliary alarm signal, for unlatching a door so as to allow it to be opened.

13. The network of claim 1, in combination with an auxiliary device comprising:

(a) an RF receiver for receiving a neighboring hazard signal from a neighboring atmospheric hazard detector when a dangerous-level output is detected by the neighboring detector;

(b) a latching switch for providing an auxiliary alarm signal only after said RF receiver has received said neighboring hazard signal for a predetermined period of time; and (c) a light, responsive to said auxiliary alarm signal, for illuminating an escape path.

14. The combination of claim 13, wherein said auxiliary device is battery powered.

15. The network of claim 1, in combination with an auxiliary device comprising:

(a) an RF receiver for receiving a neighboring hazard signal from a neighboring atmospheric hazard detector when a dangerous-level output is detected by the neighboring detector;

(b) a latching means for providing an auxiliary alarm signal only after said RF receiver has received said neighboring hazard signal for a predetermined period of time;

(c) a voice-playing device, responsive to said auxiliary alarm signal, for generating a dialing signal and voice signal of an emergency in progress; and (d) a telephone device, responsive to said auxiliary alarm signal, for receiving said dialing and voice signal, and dialing a phone number and playing said voice signal.

16. The combination of claim 15, wherein said auxiliary device is battery powered.

17. The network of claim 1, in combination with an auxiliary device comprising:

(a) an RF receiver for receiving a neighboring hazard signal from a neighboring atmospheric hazard detector when a dangerous-level output is detected by the neighboring detector;

(b) a latching switch for providing an auxiliary alarm signal only after said RF receiver has received said neighboring hazard signal for a predetermined period of time; and (c) an auxiliary audible alarm indicating means, responsive to said auxiliary alarm signal, for alerting persons outside the immediate vicinity of said atmospheric hazard detector network of the presence of an alarm condition.

18. The combination of claim 17, wherein said auxiliary device is battery powered.

19. The combination of claim 12, wherein said auxiliary device is battery powered.

20. A network of atmospheric hazard detectors, each detector comprising:

(a) alarm-indication means for producing at least an audible alarm;

(b) a sensor for sensing the presence of an atmospheric hazard and creating a sensor output;

(c) detection means for measuring said sensor output and creating a local hazard signal when said atmospheric hazard exceeds a predetermined danger level;

(d) an RF receiver for receiving a neighboring hazard signal from a neighboring atmospheric hazard detector when a dangerous-level output is detected by the neighboring detector;

(e) an RF transmitter for asynchronously sending a neighboring hazard signal to at least one neighboring atmospheric hazard detector upon said local hazard signal being created; and (f) alarm-selection means for producing a local alarm control signal whenever said local hazard signal is present, and for producing a neighboring alarm control signal when said neighboring hazard signal is present but said local hazard signal is absent;

(g) said local alarm and neighboring alarm control signals respectively causing said alarm-indication means to produce a continuous audible alarm and a pulsed audible alarm.

21. The network of claim 20, comprising a pulsing means connected between said detection means and said RF transmitter for providing an RF signal with a master pulse rate that sets the pulse rates for any neighborhood alarm control signal of any neighboring atmospheric hazard detectors, so as to facilitate identification of a detector subject to a local hazard.

22. The network of claim 20, comprising a pulsing means connected between said RF receiver and said alarm-selection means, for creating said pulsed neighboring alarm control signal in the presence of a neighboring hazard signal received from said RF receiver.

23. The network of claim 22, further including a latch means responsive to a neighboring hazard signal received by said RF receiver, for maintaining the production of a pulsed audible alarm for a predetermined time after initially receiving said neighboring hazard signal.

24. The network of claim 20, wherein said RF receiver and RF transmitter include means for modulation coding the neighboring hazard signal so that, when such signal is broadcast by RF transmission, it is received only by neighboring atmospheric hazard detectors employing the same coding.

25. The network of claim 24, further including control means, responsive to the condition of said detection means and said RF receiver for:

(a) disabling said RF transmitter from sending a neighboring hazard signal when said RF receiver receives a neighboring hazard signal before said detection means creates said local hazard signal; and (b) enabling said RF transmitter to send a neighboring hazard signal when said detection means creates a local hazard signal before said RF receiver receives a neighboring hazard signal.

26. The network of claim 25, wherein said control means is further responsive to the condition of said detection means not creating a local hazard signal and said RF receiver receiving a neighboring hazard signal, for disabling said RF transmitter from sending a neighboring hazard signal, so as to prevent a further hazard detector from being confused by a plurality of conflicting RF signals.

27. The network of claim 20, wherein said alarm indication means comprises a single audible alarm circuit responsive to both said local hazard signal and said neighboring hazard signal.

28. An atmospheric hazard detector network, including a plurality of hazard detectors each comprising:

(a) alarm-indication means for producing at least one human-perceptible alarm indication;

(b) a sensor for sensing the presence of an atmospheric hazard and creating a sensor output;

(c) detection means for measuring said sensor output and creating a local hazard signal when said atmospheric hazard exceeds a predetermined danger level;

(d) an RF receiver for receiving a neighboring hazard signal from a neighboring atmospheric hazard detector when a dangerous-level output is detected by the neighboring detector;

(e) an RF transmitter for sending a neighboring hazard signal to at least one neighboring atmospheric hazard detector when said local hazard signal is present;

(f) alarm-selection means for producing a local alarm control signal whenever said local hazard signal is present, and for producing a neighboring alarm control signal when said neighboring hazard signal is present but said local hazard signal is absent; and (g) control means for implementing delayed, synchronous, RF re-transmission of said neighboring hazard signal received by said RF receiver in one detector from a neighboring detector; and for implementing automatic return of said one detector to a quiet state after all local hazards are clear;

(h) said control means comprising:

(i) means to generate a transmit command signal having active and inactive states, which respectively cause and inhibit RF transmission of said neighboring hazard signal;

(ii) the minimum duration of the inactive state being longer than the active state of said transmit command signal such that sufficient time is allowed for re-transmissions from neighboring detectors to be completed before enabling RF transmission again;

(iii) immediately following said minimum duration, if any of said local hazard signal and said neighboring hazard signal is in the active state, then the active state of said transmit command signal is triggered to begin RF transmission; and (iv) following said minimum duration, if both of said local hazard signal and said neighboring hazard signals are in the inactive state, then the active state of said transmit command signal is not triggered to begin RF transmission until subsequent to either said local hazard signal or said neighboring hazard signal entering into its active state.

29. The network of claim 28, in combination with an auxiliary device comprising:

(a) an RF receiver for receiving a neighboring hazard signal from a neighboring atmospheric hazard detector when a dangerous-level output is detected by the neighboring detector;

(b) a latching means for providing an auxiliary alarm signal only after said RF receiver has received said neighboring hazard signal for a predetermined period of time; and (c) a door latch, responsive to said auxiliary alarm signal, for unlatching a door so as to allow it to be opened.

30. The combination of claim 29, wherein said door latch is spring-loaded such that said door is forced opened by spring power in response to said auxiliary alarm signal.

31. The combination of claim 29, wherein said auxiliary device is battery powered.

32. The network of claim 28, wherein said control means includes means to predetermine the duration of the active state and the minimum duration of the inactive state of said transmit command signal independently of all mentioned signals.

33. The network of claim 28, wherein said alarm indication means comprises a single audible alarm circuit responsive to both said local hazard signal and said neighboring hazard signal.

34. The network of claim 28, in combination with an auxiliary device comprising:

(a) an RF receiver for receiving a neighboring hazard signal from a neighboring atmospheric hazard detector when a dangerous-level output is detected by the neighboring detector;

(b) a latching switch for providing an auxiliary alarm signal only after said RF receiver has received said neighboring hazard signal for a predetermined period of time; and (c) a light, responsive to said auxiliary alarm signal, for illuminating an escape path.

35. The combination of claim 34, wherein said auxiliary device is battery powered.

36. The network of claim 28, in combination with an auxiliary device comprising:

(a) an RF receiver for receiving a neighboring hazard signal from a neighboring atmospheric hazard detector when a dangerous-level output is detected by the neighboring detector;

(b) a latching means for providing an auxiliary alarm signal only after said RF receiver has received said neighboring hazard signal for a predetermined period of time;

(c) a voice-playing device, responsive to said auxiliary alarm signal, for generating a dialing signal and voice signal of an emergency in progress; and (d) a telephone device, responsive to said auxiliary alarm signal, for receiving said dialing and voice signal, and dialing a phone number and playing said voice signal.

37. The combination of claim 36, wherein said auxiliary device is battery powered.

38. The network of claim 28, in combination with an auxiliary device comprising:

(a) an RF receiver for receiving a neighboring hazard signal from a neighboring atmospheric hazard detector when a dangerous-level output is detected by the neighboring detector;

(b) a latching switch for providing an auxiliary alarm signal only after said RF receiver has received said neighboring hazard signal for a predetermined period of time; and (c) an auxiliary audible alarm indicating means, responsive to said auxiliary alarm signal, for alerting persons outside the immediate vicinity of said atmospheric hazard detector network of the presence of an alarm condition.

39. The combination of claim 38, wherein said auxiliary device is battery powered.

* * * * *